Patented Dec. 28, 1948

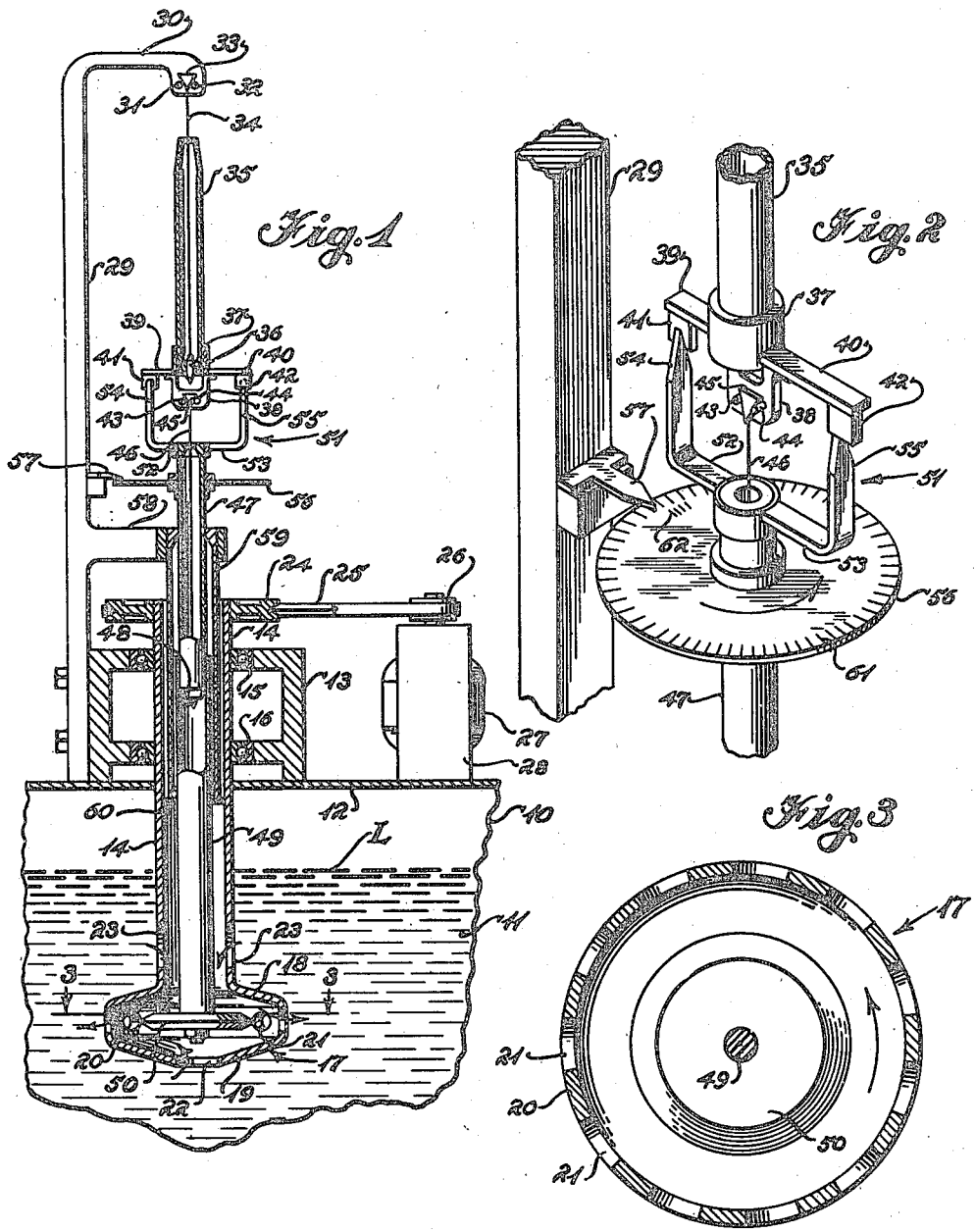

2,457,247

UNITED STATES PATENT OFFICE 2,457,247

VISCOSIMETER

Walter D. Lawshe, Seattle, Wash., assignor, by mesne assignments, to Monsanto Chemical Company, Seattle, Wash., a corporation of Delaware Application August 28, 1946, Serial No. 693,553

5 Claims. (Cl. 73—59)

1

The present invention relates to a wide range torsional viscosimeter adapted for directly indicating viscosity changes of a fluid as they occur in a chemical process so as to permit immediate application of control measures.

Narrow range torsional viscosimeters of the indirect or sampling type have long been used but they are unsatisfactory for controlling chemical processes where there is usually no time to withdraw and test samples in order to ascertain the need for making some change in the process.

The operating principle of torsional viscosimeters is to suspend an element within a cup, containing the fluid to be measured, by means of a torsion wire attached to an external fixed support and then create a rotating movement in the fluid which tends to impart a twist to the wire, the amount of twist being taken as a measure of the viscosity of the fluid.

Serious difficulty is encountered in attempting to apply this principle to the control of a chemical process which involves critical viscosity changes in a fluid. In the first place, it is not possible to rotate a large reaction vessel containing fluid. It is also impractical to rotate the external support for the immersion element. Another difficulty is the irregular turbulence within the mass of fluid created by the stirring devices necessary in most chemical processes. Further serious difficulty lies in the fact that any single torsion wire has a quite narrow range over which it can be twisted to give an accurate indication of viscosity and the changes to be determined in chemical processes are usually much wider than the range of any single wire. On the other hand, control by the sampling type of apparatus is too slow and inaccurate to be effective. During the time required to withdraw and test a sample, critical changes often occur in the main batch and the readings are also inaccurate because of temperature change during sampling. Difficulties of this character have hitherto prevented a satisfactory solution of the problem so that the control of many chemical processes has been left on a regrettably "hit or miss" basis with consequent variable quality of product.

The present invention solves this troublesome problem affording accurate and immediate indicating or, if desired, recording of viscosity changes over any required range from start to finish of a batch chemical process. This improvement, for the first time, makes possible accurate chemical control of a process of this character.

2

My solution of this problem involves the new feature of extending the range of the usual single supporting torsion wire by a system of compounding so that small changes in viscosity can be accurately indicated by a light, easily twisted wire and, when the range of that wire is exhausted, the twisting force is automatically transferred to a heavier wire, or a succession thereof, permitting accurate measurement throughout any desired viscosity range regardless of its extent.

As another feature, I secure an adequate rotational movement for a portion of the liquid by providing a submerged rotatable element within a chamber which is rotated at constant speed and also performs the functions of continually supplying fresh material from the main body of the batch and damping out turbulence caused by stirring and circulating devices.

The invention is shown in illustrative embodiment in the accompanying drawing in which Figure 1 is a view of the new apparatus partly in vertical section and partly in elevation.

Figure 2 shows in perspective and on an enlarged scale torque transfer and indicating devices which appear in Figure 1, and Figure 3 is an enlarged section on line 3—3 of Figure 1.

Reference numeral 10 represents a tank containing material 11, whose viscosity is to be tested, up to the level L, Figure 1. The tank has a top wall 12 on which is secured a frame 13 which supports a vertical tubular member 14 by means of journal-thrust bearings 15 and 16. Member 14 extends with running clearance through the top wall 12 and rigidly fixed to its lower end is a hollow head 17 which comprises upper and lower conical walls 18 and 19 joined by a cylindrical wall 20 which is provided with a number of openings 21. The bottom wall 19 has a central opening 22 and, immediately above the head, member 14 is provided with a plurality of side openings 23. Above the frame 13 member 14 has fixed thereto a pulley 24 engaged by a belt 25 driven from a pulley 26 on the armature shaft of a motor 27 supported by an upright 28 secured on the top wall 12.

Secured to one side of frame 13 is a pedestal 29 having a horizontal top portion 30 to whose extremity are secured parallel horizontally projecting pins 31 and 32 which have opposed notches engaging a triangular suspension member 33 to which is fixed a depending torsion member, here shown as a round wire 34. The wire extends freely downwardly through the constricted upper end of a tube 35 and its lower end is fixed to an anchor member 36 which is seized in the lower end of tube 35. A nipple 37 is secured to the lower end of tube 35, as by threading thereon, and has fixed thereto a depending yoke 38 to the top of which are secured diametrically projecting arms 39 and 40 to whose undersides are fixed abutments 41 and 42 of which the latter is spaced substantially farther than the former from the axis of tube 35. Parallel horizontally projecting pins 43 and 44 on the yoke support a triangular suspension member 45 to which is fixed a depending torsion member here shown as a round wire 46 which is in alignment with wire 34. Wire 46 extends freely through the constricted upper end of a tubular vertical shaft portion 47 and is secured to an anchor member 48 seized in the lower end of portion 47. A shaft portion 49 is fixed to the lower end of portion 47, as by being threaded thereon, and has secured to its lower end a coaxial disc 50 which is symmetrically disposed in the head 19 with considerable clearance all around.

Fixed to the upper end of portion 47 is a U-shaped member 51 including diametrical arms 52 and 53 and upwardly extending arms or abutment portions 54 and 55 whose upper ends, as most clearly shown in Figure 2, lightly bear against opposite sides of abutments 41 and 42.

Fixed on member 47 below member 52 is a graduated disc 56 with which cooperates a pointer 57 mounted on pedestal 29. Projecting from the pedestal is an arm 58 in which is engaged the upper end of a tubular guide member 59, the upper end of member 59 being constricted to provide a running fit with shaft portion 47 and the lower end of member 59 having secured therein a bushing 60 providing a running fit with shaft portion 49, the bushing having an out-turned flange with a running fit with tubular member 14.

The suspension members 33 and 45 fixedly hold the upper ends of wires 34 and 46 against rotation relative to the support 30 as to wire 34 and relative to yoke 38 as to wire 46, and with the lost-motion torque transmitting connection, constituted by the cooperating stop means, in the starting position illustrated, dial 56 is at zero position with respect to pointer 57. With the head end of tubular member 14 submerged below the side openings 23 and the tubular member being driven counter-clockwise, looking down, Figure 1, head 17 operates as a centrifugal pump to draw the material 11 in through the side openings 23 and the bottom opening 22 and expel it through the peripheral openings 21. The paths of the material through the interior of the head are not radial but are vortical due to the rotation of the head. The impingement of the flow on the faces of disc 50 causes a drag on the latter so that the disc tends to be driven in the same direction as the head, that is, in the direction of the arrow, Figure 3. Inasmuch as the head is driven at constant speed, the torque effect on disc 50 will be in direct proportion to the viscosiy of the material being tested.

Disc 50 is supported through wire 46 which, as here contemplated, is considerably lighter, that is, less torque resistant, than wire 34, and is twistable throughout a certain range, here considered to be at least 360°, without imparting twisting distortion to wire 34 through the coupling fitting 38. Therefore, as a result of the torque exerted on disc 50, wire 46 will be initially twisted without substantially disturbing the position of yoke 38 as supported by wire 34.

U-shaped member 51 and dial 56 exactly reflect the turning of disc 50 as resisted by wire 46 and the two can turn nearly 360° relative to yoke 38 for the reason that abutment arm 54 travels in a circle inwardly of abutment 42 while abutment arm 55 travels in a circle outwardly of abutment 41. Consequently, after nearly 360° movement of disc 50 in the direction of the arrow, Figure 2, abutment arms 54 and 55 will engage the opposite sides of abutments 41 and 42, which were hitherto stationary, and the further torque effect of disc 50 will be transferred completely from wire 46 to wire 34. Reference numeral 61 designates primary graduations which may be read prior to the described closing of the lost motion connection and a secondary scale 62 may be provided for reading after the connection has closed. The scale 62 may be arranged as a continuation of the scale 61 with the graduations appropriately closer together in accordance with the difference in torque resistance of the two wires. Obviously, a further wire could be provided to take over after wire 34, and so on.

The described apparatus gives a continuous reading of great accuracy due to the circulation of material 11 through the head 19 and, obviously, the testing range of the apparatus can be made as wide as desired.

In Figure 1 it has not been attempted to go into great constructional detail since it is believed that any matters of design having to do with assembly problems are merely mechanical and unnecessary to enlarge upon. For example, it will be evident that the head 19 must be made in sections in order to be able to receive the disc 50 whose diameter is substantially greater than the diameter of opening 22 or the inside of tubular member 14. The invention is not limited to such matters of form and arrangement and the disclosure herein is intended to be merely illustrative of the invention as defined in the following claims.

I claim:

1. In a viscosimeter, a support, an upper torsion member fixed to and depending from said support, a lower torsion member in fixed connection with and depending from the lower end of said upper member, a rotatable member fixed to the lower end of said lower member, means for applying torque to said rotatable member in accordance with the viscosity of the material to be tested, said torsion members being unequally torque resistant so that one is twistable through a certain range by said rotatable member without substantial twisting distortion occurring in the other, means operative before said twisting range is exceeded for transferring the torque of said rotatable member from said one to said other torsion member, and indicating means driven from said rotatable member.

2. In a viscosimeter, a support, an upper torsion member fixed to and depending from said support, a lower torsion member in fixed connection with and depending from the lower end of said upper member, a rotatable member fixed to the lower end of said lower member, means for applying torque to said rotatable member in accordance with the viscosity of the material to be tested, the lower torsion member being less torque resistant than the upper so as to be twistable through a certain range by said rotatable member without imparting substantial twisting distortion to the upper torsion member, a lost-motion torque transmitting connection between said rotatable member and the lower end of said upper torsion member arranged to close before said range is exceeded whereby to transfer the torque of said rotatable member from the lower to the upper torsion member, and indicating means driven from said rotatable member.

3. Structure according to claim 2 wherein the lost-motion connection comprises a pair of radial arms connected to the upper end of the lower torsion member, each of the radial arms having a cooperative abutment connected to the lower end of the upper torsion member, said radial arms being relatively swingable in different planes thereby permitting a relative swing of substantially 360° before engagement by the radial arms of their cooperative abutments on the upper torsion member.

4. In a viscosimeter, a support, a relatively heavy wire fixed to and depending from said support, a fitting secured to the lower end of said heavy wire, a relatively light wire fixed to and depending from said fitting, a rotatable member fixed to the lower end of said light wire, said rotatable member being a rotary tubular member, a hollow head fixed to one end of said tubular member, a rotatable shaft in said tubular member with a flow space between the two, a disc fixed on said shaft within said head with flow clearance all around, said head having peripheral openings and having a central opening at its end opposite said tubular member and said tubular member having a side opening to said space whereby with the head end of the tubular member submerged at a level above said side opening in the material to be tested, rotation of the tubular member will cause the material to be drawn into said head through said side and central openings against the faces of said disc producing a torque on the latter and to be expelled through said peripheral openings, said light wire being twistable through a certain range by the torque produced on said rotatable member without imparting substantial twisting distortion to the heavy wire, a lost-motion torque transmitting connection between said rotatable member and said fitting wherein the lost-motion connection comprises a pair of radial arms connected to the upper end of the lower torsion member, each of the radial arms having a cooperative abutment connected to the lower end of the upper torsion member, said radial arms being relatively swingable in different planes thereby permitting a relative swing of substantially 360° before engagement by the radial arms of their cooperative abutments on the upper torsion member whereby the torque of said rotatable member is transferred from the light to the heavy wire, and indicating means driven from said rotatable member.

5. In a viscosimeter, a support, a relatively heavy wire fixed to and depending from said support, a fitting secured to the lower end of said heavy wire, a relatively light wire fixed to and depending from said fitting, a rotatable member fixed to the lower end of said light wire, means for applying torque to said rotatable member in accordance with the viscosity of the material to be tested, said light wire being twistable through a certain range by said rotatable member without imparting substantial twisting distortion to the heavy wire, a lost-motion torque transmitting connection between said rotatable member and said fitting arranged to close before said range is exceeded whereby to transfer the torque of said rotatable member from the light to the heavy wire, and indicating means driven from said rotatable member.

WALTER D. LAWSHE.

REFERENCES CITED

The following references are of record in the file of this patent:

UNITED STATES PATENTS

| Number | Name | Date |
| --- | --- | --- |
| 2,203,132 | Delamere | June 4, 1940 |
| 2,305,531 | Hurndall | Dec. 15, 1942 |